United States Patent
Li (10) Patent No.: US 12,533,985 B2
(45) Date of Patent: Jan. 27, 2026

(54) BATTERY REPLACEMENT HYBRID ELECTRIC VEHICLE, BATTERY REPLACEMENT STRATEGY DETERMINATION METHOD THEREOF AND VEHICLE CONTROLLER

(71) Applicant: ZHEJIANG GEELY HOLDING GROUP CO., LTD., Hangzhou (CN)

(72) Inventor: Shufu Li, Hangzhou (CN)

(73) Assignee: ZHEJIANG GEELY HOLDING GROUP CO., LTD., Hangzhou (CN)

( * ) Notice: Subject to any disclaimer, the term of this patent is extended or adjusted under 35 U.S.C. 154(b) by 85 days.

(21) Appl. No.: 18/435,261

(22) Filed: Feb. 7, 2024

(65) Prior Publication Data

US 2024/0174119 A1    May 30, 2024

Related U.S. Application Data

(63) Continuation of application No. PCT/CN2022/112484, filed on Aug. 15, 2022.

(30) Foreign Application Priority Data

Aug. 20, 2021 (CN) .......................... 202110959729.1

(51) Int. Cl.
*B60L 58/12* (2019.01)
*B60L 53/80* (2019.01)
*B60L 58/16* (2019.01)

(52) U.S. Cl.
CPC ............... *B60L 53/80* (2019.02); *B60L 58/12* (2019.02); *B60L 58/16* (2019.02); *B60L 2260/52* (2013.01); *B60L 2270/12* (2013.01)

(58) Field of Classification Search
CPC .......... B60L 53/80; B60L 58/12; B60L 58/16; B60L 2260/52; B60L 2270/12
See application file for complete search history.

(56) References Cited

U.S. PATENT DOCUMENTS

| 2012/0176231 A1 | 7/2012 | Skaff et al. |
| 2013/0181516 A1* | 7/2013 | Phan ....................... B60L 58/20 307/10.7 |

(Continued)

FOREIGN PATENT DOCUMENTS

| CN | 102139645 A | 8/2011 |
| CN | 104960396 A | 10/2015 |

(Continued)

OTHER PUBLICATIONS

First Office Action issued in counterpart Chinese Patent Application No. 202110959729.1, dated Oct. 16, 2023.

(Continued)

*Primary Examiner* — Adnan M Mirza
(74) *Attorney, Agent, or Firm* — Westbridge IP LLC (57) ABSTRACT

Disclosed are a battery replacement strategy determination method for a battery replacement hybrid vehicle, a vehicle controller and a battery replacement hybrid vehicle. The method includes: determining a target driving condition of a vehicle, the target driving condition being a current driving condition or an upcoming driving condition of the vehicle; selectively obtaining required information from status information of the vehicle, energy price information, and user usage habit information of the vehicle according to the target driving condition; and determining a target battery replacement strategy according to a battery replacement strategy determination rule corresponding to the target driving condition, based on the obtained information, and recommending the target battery replacement strategy to a user. While the convenience of use of the vehicle is ensured, the economy of use of the vehicle is also ensured, and the cost of vehicle usage for the user under different driving conditions is reduced.

6 Claims, 4 Drawing Sheets

(56) References Cited

U.S. PATENT DOCUMENTS

2014/0188304 A1* 7/2014 Richter ............... B60L 58/12
                                                    701/1
2020/0047631 A1  2/2020 Kupfer et al.
2024/0017639 A1* 1/2024 Li .................... G01C 21/3679

FOREIGN PATENT DOCUMENTS

| CN | 106926732 A | 7/2017 |
| CN | 211106988 U | 7/2020 |
| CN | 111746333 A | 10/2020 |
| CN | 112060970 A | 12/2020 |
| CN | 112060971 A | 12/2020 |
| CN | 112116133 A | 12/2020 |
| CN | 112937360 A | 6/2021 |
| CN | 113479110 A | 10/2021 |
| DE | 102012015961 A1 | 2/2014 |
| KR | 20110113405 A | 10/2011 |
| WO | 2009092343 A1 | 7/2009 |
| WO | 2013024484 A1 | 2/2013 |

OTHER PUBLICATIONS

Grant Notification issued in counterpart Chinese Patent Application No. 202110959729.1, dated Dec. 1, 2023.
International Search Report and Written Opinion issued in corresponding PCT Application No. PCT/CN2022/112484, dated Nov. 18, 2022.
Extended European Search Report issued in counterpart European Patent Application No. 22857739.1, dated Jun. 4, 2025.

* cited by examiner

BATTERY REPLACEMENT HYBRID ELECTRIC VEHICLE, BATTERY REPLACEMENT STRATEGY DETERMINATION METHOD THEREOF AND VEHICLE CONTROLLER

CROSS-REFERENCE TO RELATED APPLICATIONS

The present application is a continuation application of International Application No. PCT/CN2022/112484, filed on Aug. 15, 2022, which claims priority to Chinese Patent Application No. 202110959729.1, filed on Aug. 20, 2021. The disclosures of the above-mentioned applications are incorporated herein by reference in their entireties.

TECHNICAL FIELD

The present application relates to the technical field of vehicles, and in particular to a battery replacement strategy determination method for a battery replacement hybrid vehicle, a vehicle controller and a battery replacement hybrid vehicle.

BACKGROUND

Hybrid technology is a key technology to achieve energy saving and emission reduction of vehicles. Plug-in hybrid vehicles are a new energy vehicle between pure electric vehicles and fuel vehicles. They can not only achieve pure electric, zero-emission driving, but also increase the vehicle's range through hybrid mode. In medium to low speed operating conditions, pure electric driving of plug-in hybrid vehicles can significantly reduce operating costs of the vehicle. However, battery packs with fixed-capacity cannot meet the actual needs of users with different commuting distances. In long-distance high-speed driving conditions, the plug-in hybrid vehicles are basically in a traditional fuel mode, and the battery pack with large capacity increases the weight of the vehicle, which in turn reduces the fuel economy of the vehicle.

In response to the above problems, the related technologies have already developed solutions to meet the needs of different users by installing two batteries with different capacities on the vehicle, and defined an energy supplement solution (battery replacement or fuel refueling) during a single driving process of the vehicle. However, existing solutions do not consider the economy of battery replacement or refueling when replenishing energy, nor do they recommend reasonable battery capacity based on the driver's historical driving data, especially when the user is prompted to quickly replace the battery during short distance driving, there is no specific instruction on how to select a matching quick-change battery to ensure better vehicle convenience and economy.

SUMMARY

In view of the above problems, a battery replacement strategy determination method for a battery replacement hybrid vehicle, a vehicle controller and a battery replacement hybrid vehicle that overcome the above problems or at least partially solve the above problems are proposed.

An objective of the present application is to provide a battery replacement strategy determination method for a battery replacement hybrid vehicle that can ensure the convenience and economy of using the vehicle.

A further objective of the present application is to further improve the economy of the entire vehicle by determining a battery replacement strategy based on the economic benefits brought by battery replacement under a long-distance high-speed condition.

Another further objective of the present application is to recommend suitable battery capacity to the user by taking into account factors such as vehicle status, oil prices, electricity prices, user usage habits.

In particular, according to an aspect of the embodiment of the present application, a battery replacement strategy determination method for a battery replacement hybrid vehicle is provided, including:
  determining a target driving condition of the vehicle, the target driving condition is a current driving condition or an upcoming driving condition of the vehicle;
  selectively obtaining required information from status information of the vehicle, energy price information, and user usage habit information according to the target driving condition; and
  determining a target battery replacement strategy according to a battery replacement strategy determination rule corresponding to the target driving condition, based on the obtained information, and recommending the target battery replacement strategy to a user.

In an embodiment, the target driving conditions include a long-distance high-speed driving condition and an urban commuting condition.

In an embodiment, when the target driving condition is the long-distance high-speed driving condition, the step of selectively obtaining the required information from the status information of the vehicle, the energy price information and the user usage habit information according to the target driving condition includes:
  obtaining the status information of the vehicle and the energy price information,
  the status information of the vehicle includes the set distance to be traveled, the increase in fuel consumption of current weight of a battery under the long-distance high-speed driving condition, current remaining mileage of the battery, and average fuel consumption of the vehicle without the battery under the long-distance high-speed driving condition; and the energy price information includes a price of removing the battery at a battery replacement station, a price of loading the battery at the battery replacement station, current power consumption per unit distance of the vehicle, a current oil price and a current electricity price.

In an embodiment, the battery replacement strategy determination rule corresponding to the long-distance high-speed driving condition includes:
  calculating a first total traveling cost without removing the battery and a second total traveling cost after removing the battery based on the status information of the vehicle and the energy price information;
  calculating a first difference between the first total traveling cost and the second total traveling cost;
  determining whether the first difference is greater than a first setting value;
  determining the target battery replacement strategy is to remove the battery, in response to that the first difference is greater than the first setting value; and
  determining the target battery replacement strategy is to not remove the battery, in response to that the first difference is not greater than the first setting value.

In an embodiment, the first total traveling cost is calculated according to formula (1): $Cost1=F \times N \times D/100+(L-D)/100 \times (E+B) \times C$ (1); the second total traveling cost is calculated according to formula (2): $Cost2=(A1+A2)+L/100 \times E \times C$ (2); Cost1 and Cost2 respectively represent the first total traveling cost and the second total traveling cost, in yuan; A1 and A2 respectively represent the price of removing the battery at the battery replacement station and the price of loading the battery at the battery replacement station, in yuan; L represents the set distance to be traveled, in kilometers; B represents the increase in fuel consumption of the current weight of the battery under the long-distance high-speed driving condition, in liters/100 kilometers; C represents the current oil price, in yuan/liter; D represents the current remaining mileage of the battery, in kilometers; E represents the average fuel consumption of the vehicle without the battery under the long-distance high-speed driving condition, the unit is liter/100 kilometers; F represents the current power consumption per unit distance of the vehicle, in kilowatt-hour/100 kilometers; and N represents the current electricity price, in yuan/kilowatt-hour.

In an embodiment, when the target driving condition is the urban commuting condition, the step of selectively obtaining the required information from the status information of the vehicle, the energy price information and the user usage habit information according to the target driving condition includes:

obtaining the status information of the vehicle, the energy price information and the user usage habit information, the user usage habit information includes a charging cycle T of the vehicle and total driving mileage of the vehicle during n charging cycles before current moment, n is an integer greater than or equal to 3; the status information of the vehicle comprises current power consumption per unit distance of the vehicle, average driving fuel consumption in an urban fuel mode, current remaining mileage of the battery of the vehicle and current remaining mileage of the fuel of the vehicle; the energy price information comprises a current oil price, a current electricity price, a rental price of the batteries to be rented with different ranges, and a rental price of the battery of the vehicle.

In an embodiment, the battery replacement strategy determination rule corresponding to the urban commuting condition includes:

calculating a first cycle usage cost without replacing the battery and the corresponding second cycle usage costs after replacing the battery with batteries to be rented with different ranges according to the status information of the vehicle, the energy price information and the user usage habit information;

determining the lowest value among all the second cycle usage costs as the lowest cycle usage cost;

calculating a second difference between the first cycle usage cost and the lowest cycle usage cost;

determining whether the second difference is greater than a second setting value;

in response to that the second difference is greater than the second setting value, determining the target battery replacement strategy is to replace the battery of the vehicle and using the battery to be rented corresponding to the lowest cycle usage cost as a target battery for replacing the battery; or in response to that the second difference is not greater than the second setting value, determining the target battery replacement strategy is to not replace the battery of the vehicle.

In an embodiment, the step of calculating the corresponding second cycle usage costs after replacing the battery with batteries to be rented with different ranges includes:

for the batteries to be rented with different ranges, determining whether a quotient of the total driving mileage of the vehicle during n charging cycles before the current moment and n is less than or equal to the range of the battery to be rented;

in response to that the quotient of the total driving mileage of the vehicle during n charging cycles before the current moment and n is less than or equal to the range of the battery to be rented, calculating the corresponding second cycle usage cost of the battery to be rented according to formula (3): $Cost3=W+U/n/100 \times M \times N$ (3); or in response to that the quotient of the total driving mileage of the vehicle during n charging cycles before the current moment and n is greater than the range of the battery to be rented, calculating the corresponding second cycle usage cost of the battery to be rented according to formula (4): $Cost3=W+M \times N \times R/100+(U/n-R)/100 \times H \times C$ (4);

Cost3 represents the corresponding second cycle usage cost of the batteries to be rented with different ranges, in yuan; R represents the range of the batteries to be rented, in kilometers; W represents the rental price of the batteries to be rented with different ranges, in yuan; U represents the total driving mileage of the vehicle during n charging cycles before the current moment, in kilometers; M represents the current power consumption per unit distance of the vehicle, in kilowatt hours/100 kilometers; N represents the current electricity price, in yuan/kilowatt hour; H represents the average driving fuel consumption in the urban fuel mode, in liter/100 kilometers; and C represents the current fuel price, in yuan/liter.

In an embodiment, the step of calculating the first cycle usage cost without replacing the battery includes:

in response to that a sum of the current remaining mileage of the battery of the vehicle and the current remaining mileage of the fuel is greater than or equal to the quotient of the total driving mileage of the vehicle during n charging cycles before the current moment and n, determining whether the quotient of the total driving mileage of the vehicle during n charging cycles before the current moment and n is less than or equal to the current remaining mileage of the battery of the vehicle;

in response to that the quotient of the total driving mileage of the vehicle during n charging cycles before the current moment and n is less than or equal to the current remaining mileage of the battery of the vehicle, calculating the first cycle usage cost according to formula (5): $Cost4=Y+U/n/100 \times M \times N$ (5); or in response to that the quotient of the total driving mileage of the vehicle during n charging cycles before the current moment and n is greater than the current remaining mileage of the battery of the vehicle, calculating the first cycle usage cost according to formula (6): $Cost4=Y+M \times N \times P/100+(U/n-P)/100 \times H \times C$ (6), Cost4 represents the first cycle usage cost of the battery, in yuan; P represents the current remaining mileage of the battery of the vehicle, in kilometers; Y represents the rental price of the battery of the vehicle, in yuan; U represents the total driving mileage of the vehicle during n charging cycles before the current moment, in kilometers; M represents the current power consumption per unit distance of the vehicle, in kilowatt hours per 100 kilometers; N represents the current electricity price, in yuan/kWh; H represents the average driving fuel consumption in the urban fuel mode, in liters per 100 kilometers; and C represents the current oil price, in yuan/liter.

According to another aspect of the embodiment of the present application, a vehicle controller is also provided, including:

a memory in which a machine executable program is stored; and a processor, wherein the machine executable program is configured to implement any one of the battery replacement strategy determination methods as described above when executed by the processor.

According to another aspect of the embodiment of the present application, a battery replacement hybrid vehicle is also provided, including the vehicle controller as described above.

The battery replacement strategy determination method for the battery replacement hybrid vehicle, the vehicle controller and the battery replacement hybrid vehicle of the present application can selectively obtain the status information of the vehicle, the energy price information and the user usage habit information according to different vehicle driving conditions, and determine and recommend suitable target battery replacement strategies to the user based on the obtained information and guided by the economic benefits brought by battery replacement, thereby ensuring the convenience of the vehicle use while ensuring the economy of the vehicle use, and reducing the cost of the vehicle usage for the user (driver) under different driving conditions.

Further, under the long-distance high-speed driving condition, by calculating the total traveling costs without removing the battery and after removing the battery based on the status information of the vehicle and the energy price information and comparing the total traveling costs to determine whether to remove the battery, further improving economy of the vehicle under the high-speed condition.

Furthermore, under the urban commuting condition, the cycle usage costs without replacing the battery and after replacing the battery with batteries with different ranges are calculated based on the status information of the vehicle, the energy price information (including oil prices and electricity prices) and the user usage habit information, and based on the calculation result, it is determined whether to replace the battery, and in response to that it is determined to replace the battery, it will recommend the appropriate range battery to the user, which can reduce the usage cost of the battery, improve the utilization rate of the battery, and further improve the economy of the entire vehicle.

The above description is only an overview of the technical solution of the present application. In order to have a clearer understanding of the technical solution of the present application, which can be implemented according to the content of the description, and in order to make the above and other purposes, features and advantages of the present application more obvious and understandable, the specific embodiments of the present application are listed below.

According to the following detailed description of specific embodiments of the present application in conjunction with the accompanying drawings, those skilled in the art will have a better understanding of the above and other purposes, advantages and features of the present application.

BRIEF DESCRIPTION OF THE DRAWINGS

Other various advantages and benefits will become apparent to those skilled in the art upon reading the following detailed description of the preferred embodiments. The accompanying drawings are only intended to illustrate the preferred embodiments and are not to be construed a limitation of the present application. In addition, the same components are denoted with the same reference signs throughout the drawings. In the accompanying drawings.

DETAILED DESCRIPTION OF THE EMBODIMENTS

Exemplary embodiments of the present application will be described in more detail below with reference to the accompanying drawings. Although exemplary embodiments of the present application are shown in the drawings, it should be understood that the present application can be embodied in various forms and should not be limited to the embodiments set forth herein. Rather, these embodiments are provided to provide a thorough understanding of the present application, and to fully convey the scope of the present application to those skilled in the art.

In medium to low speed driving conditions, pure electric driving of plug-in hybrid vehicles can significantly reduce operating costs of the vehicle. However, battery packs with fixed capacity cannot meet the actual needs of users with different commuting distances. In long-distance high-speed driving conditions, the plug-in hybrid vehicle is basically in the traditional fuel mode, and the battery pack with large capacity increases the weight of the vehicle, which in turn reduces the fuel economy of the vehicle.

In response to the above problems, the present application adopts a battery replacement method and proposes a battery replacement determination method for a battery replacement hybrid vehicle. Based on the economic benefits brought by battery replacement, the appropriate battery replacement strategies under different driving conditions are determined to ensure the convenience and economy of using the entire vehicle. The battery mentioned in the present application refers to a battery replacement battery.

Figure 1:
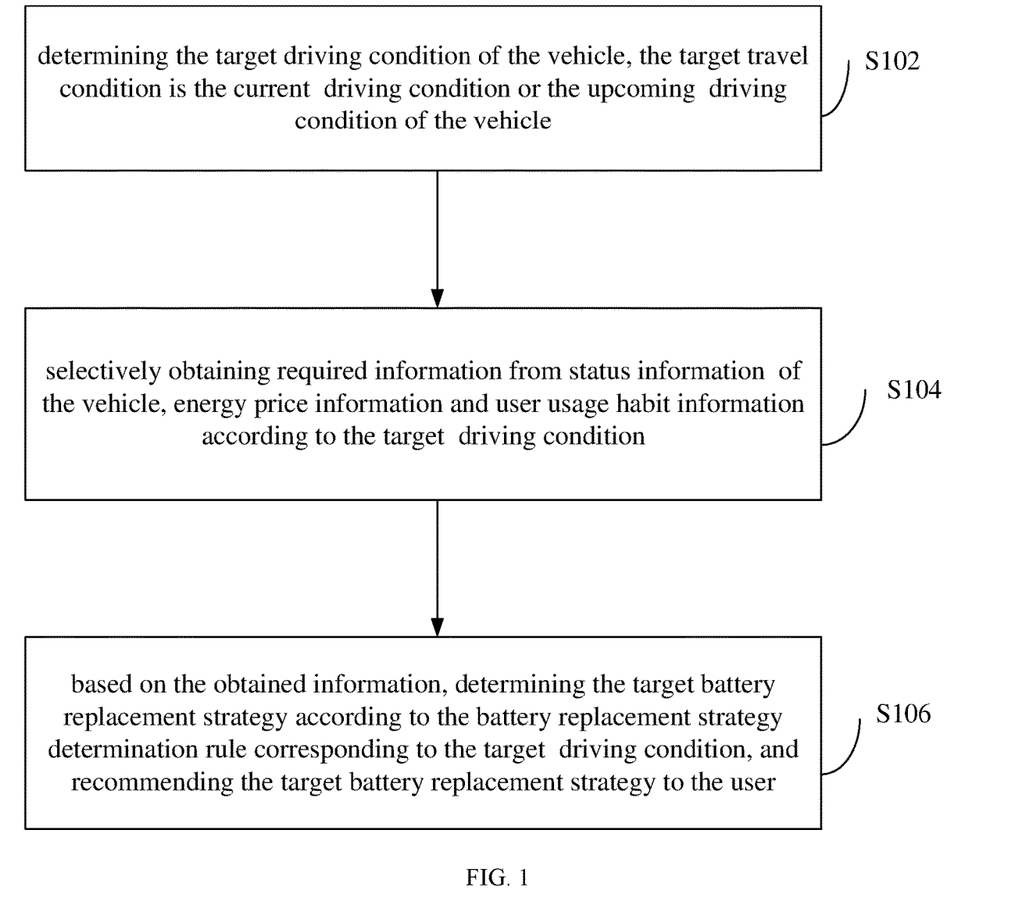
FIG. 1 shows a schematic flowchart of a battery replacement strategy determination method for a battery replacement hybrid vehicle according to an embodiment of the present application.

FIG. 1 shows a schematic flowchart of a battery replacement strategy determination method for a battery replacement hybrid vehicle according to an embodiment of the present application. As shown in FIG. 1, the battery replacement strategy determination method can at least include the following steps S102 to S106.

Step S102, determining the target driving condition of the vehicle, the target driving condition is the current driving condition or the upcoming driving condition of the vehicle.

Step S104, selectively obtaining required information from status information of the vehicle, energy price information and user usage habit information according to the target driving condition.

Step S106, based on the obtained information, determining the target battery replacement strategy according to the battery replacement strategy determination rule corresponding to the target driving condition, and recommending the target battery replacement strategy to the user.

The battery replacement strategy determination method for a battery replacement hybrid vehicle provided by the embodiment of the present application selectively acquires the status information of the vehicle, energy price information and user usage habit information based on different driving conditions of the vehicle, and based on the acquired information and guided by the economic benefits brought by battery replacement, appropriate target battery replacement strategies are determined and recommended to users, thereby ensuring the convenience of vehicle use while ensuring the economy of vehicle use and reducing vehicle usage costs for user (driver) under different driving conditions.

Generally speaking, the target driving conditions of the vehicle can include long-distance high-speed driving conditions and urban commuting conditions (usually medium and low-speed driving conditions). The information obtained and the battery replacement strategy determination rule corresponding to different target driving conditions are also different, that is, the required information is obtained respectively under long-distance high-speed driving conditions and urban commuting conditions, and different battery replacement strategy determination rules are used to determine the target battery replacement strategy. These two driving conditions will be described in detail below.

Embodiment 1

Figure 2:
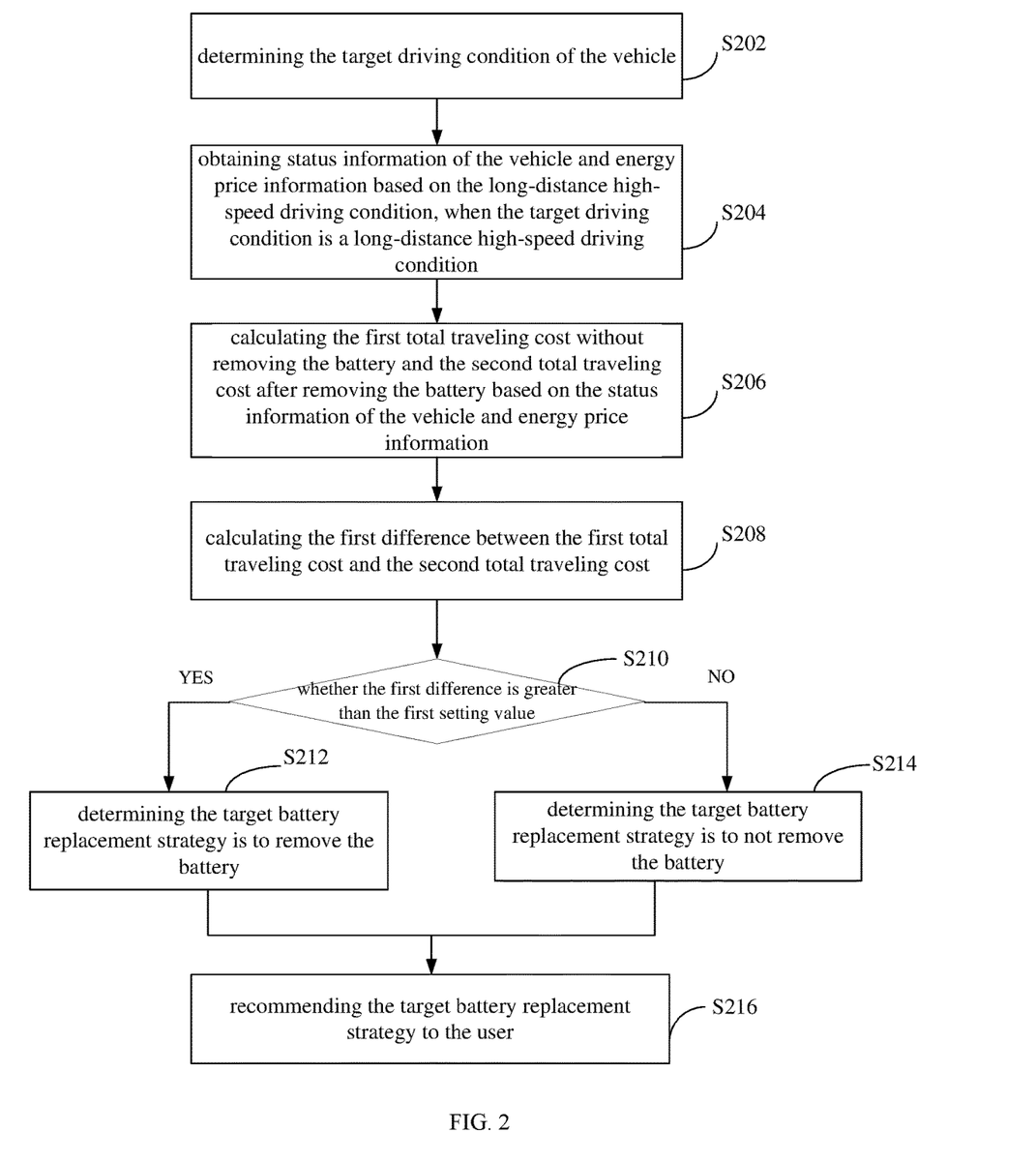
FIG. 2 shows a schematic flowchart of a battery replacement strategy determination method for a battery replacement hybrid vehicle according to another embodiment of the present application.

FIG. 2 shows a schematic flowchart of a battery replacement strategy determination method for a battery replacement hybrid vehicle according to another embodiment (Embodiment 1) of the present application. As shown in FIG. 2, the battery replacement strategy determination method in this embodiment includes the following steps S202 to S216.

Step S202, determining the target driving condition of the vehicle.

In Embodiment 1, it is determined that the target driving condition of the vehicle is long-distance high-speed driving condition. In practical applications, this method can be started when the vehicle is already in long-distance high-speed driving conditions (that is, when the vehicle has begun long-distance high-speed driving) to determine the battery replacement strategy. For example, this method can be started when the vehicle arrives at the battery replacement station during long-distance high-speed driving, or can be started before the vehicle is about to travel at high speed for a long distance to determine the battery replacement strategy.

Determining the target driving conditions can be carried out in various ways. For example, it can be determined by receiving the condition information input by the user (such as user confirmation of long-distance high-speed driving conditions), or by obtaining real-time parameters (such as vehicle speed, single distance traveled, etc.).

Step S204, obtaining status information of the vehicle and energy price information based on the long-distance high-speed driving condition, when the target driving condition is a long-distance high-speed driving condition.

As described above, in long-distance and high-speed conditions, the entire vehicle is basically in the traditional fuel mode, and a large-capacity battery pack will also affect fuel consumption due to the increased weight of the vehicle.

Therefore, it is necessary to comprehensively consider the vehicle status and energy prices to estimate the economic benefits of battery replacement. Therefore, in the embodiment 1, when the target driving condition is a long-distance high-speed driving condition, the status information of the vehicle and energy price information are obtained as a basis for subsequent determination of the battery replacement strategy.

After determining that the target driving condition is a long-distance high-speed driving condition and obtaining the status information of the vehicle and energy price information accordingly, the target battery replacement strategy can be determined based on the battery replacement strategy determination rules corresponding to the long-distance high-speed driving condition. In a specific implementation, the battery replacement strategy determination rules corresponding to the long-distance high-speed driving conditions include: calculating a first total traveling cost without removing the battery and a second total traveling cost after removing the battery based on the status information of the vehicle and energy price information; calculating a first difference between the first total traveling cost and the second total traveling cost; determining whether the first difference is greater than a first setting value; determining the target battery replacement strategy is to remove the battery, in response to that the first difference is greater than the first setting value; and determining the target battery replacement strategy is to not remove the battery, in response to that the first difference is not greater than the first setting value.

Accordingly, based on the obtained information, the step of determining the target battery replacement strategy according to the battery replacement strategy determination rules corresponding to the target driving conditions can be specifically implemented as the following steps.

Step S206, calculating the first total traveling cost without removing the battery and the second total traveling cost after removing the battery based on the status information of the vehicle and energy price information.

Step S208, calculating the first difference between the first total traveling cost and the second total traveling cost.

Step S210, determining whether the first difference is greater than the first setting value. In response to that the first difference is greater than the first setting value, step S212 is executed. In response to that the first difference is not greater than the first setting value, step S214 is executed.

Step S212, determining the target battery replacement strategy is to remove the battery.

Step S214, determining the target battery replacement strategy is to not remove the battery.

Step S216, recommending the target battery replacement strategy to the user.

In this embodiment, the first difference between the first total traveling cost and the second total traveling cost is the economic benefit brought by removing the battery of the vehicle. The first setting value can be set by the user according to the desired economy, and can generally be set to a range of 30 to 100 yuan, such as 30 yuan, 50 yuan, 70 yuan, 100 yuan, etc.

In a specific implementation of this embodiment, the status information of the vehicle can include the set distance to be traveled, the increase in fuel consumption of the current battery weight under long-distance high-speed driving conditions, the current remaining mileage of the battery and the average fuel consumption of the vehicle without the battery under long-distance high-speed driving conditions. The energy price information can include the price of removing the battery at the battery replacement station, the price of loading the battery at the battery replacement station, the current electricity consumption per unit distance of the vehicle, the current oil price, and the current electricity price.

In this case, in step S206, the first total traveling cost and the second total traveling cost can be calculated respectively according to the following formulas (1) and (2):

$$\text{cost1} = F \times N \times D/100 + (L-D)/100 \times (E+B) \times C \tag{1}$$

$$\text{cost2} = (A1+A2) + L/100 \times E \times C \tag{2}$$

In formulas (1) and (2), cost1 and cost2 represent the first total traveling cost and the second total traveling cost respectively, in yuan; A1 and A2 respectively represent the price of removing the battery at the battery replacement station and the price of loading the battery at the battery replacement station, in yuan; L represents the set distance to be traveled, in kilometers; B represents the increase in fuel consumption of the current battery weight under long-distance high-speed driving conditions, in liters per 100 kilometers; C represents the current oil price, in yuan/liter; D represents the current remaining mileage of the battery, in kilometers; E represents the average fuel consumption of the vehicle without the battery under long-distance high-speed driving conditions, in liters per 100 kilometers; F represents the current power consumption per unit distance of the vehicle, in kilowatt hour per 100 kilometers; and N represents the current electricity price, in yuan/kilowatt-hour.

It should be noted that when calculating the second total traveling cost after removing the battery, since it is usually necessary to load a specific small-capacity battery or cover plate (at this time a loading action will be performed in an unloaded state) to close the battery compartment after removing the current battery of the vehicle (usually a large-capacity battery), the price of loading the battery at the battery replacement station also needs to be considered.

In addition, those skilled in the art should understand that the method of the present application is performed on the premise that normal travel of the hybrid vehicle can be ensured. Specifically, in Embodiment 1, the battery replacement strategy determination method is performed on the premise that the current fuel remaining amount of the vehicle can support the vehicle to reach the next fuel replenishment point to ensure normal travel of the vehicle.

This embodiment calculates the economic benefits brought by removing the battery based on the obtained status information of the vehicle, fuel price information, mileage information, comprehensively considers the convenience and economy of vehicle use, and guides the user on whether they need to replace the battery during or before long-distance high-speed travel to further improve the overall vehicle economy under high-speed conditions.

Embodiment 2

Figure 3:
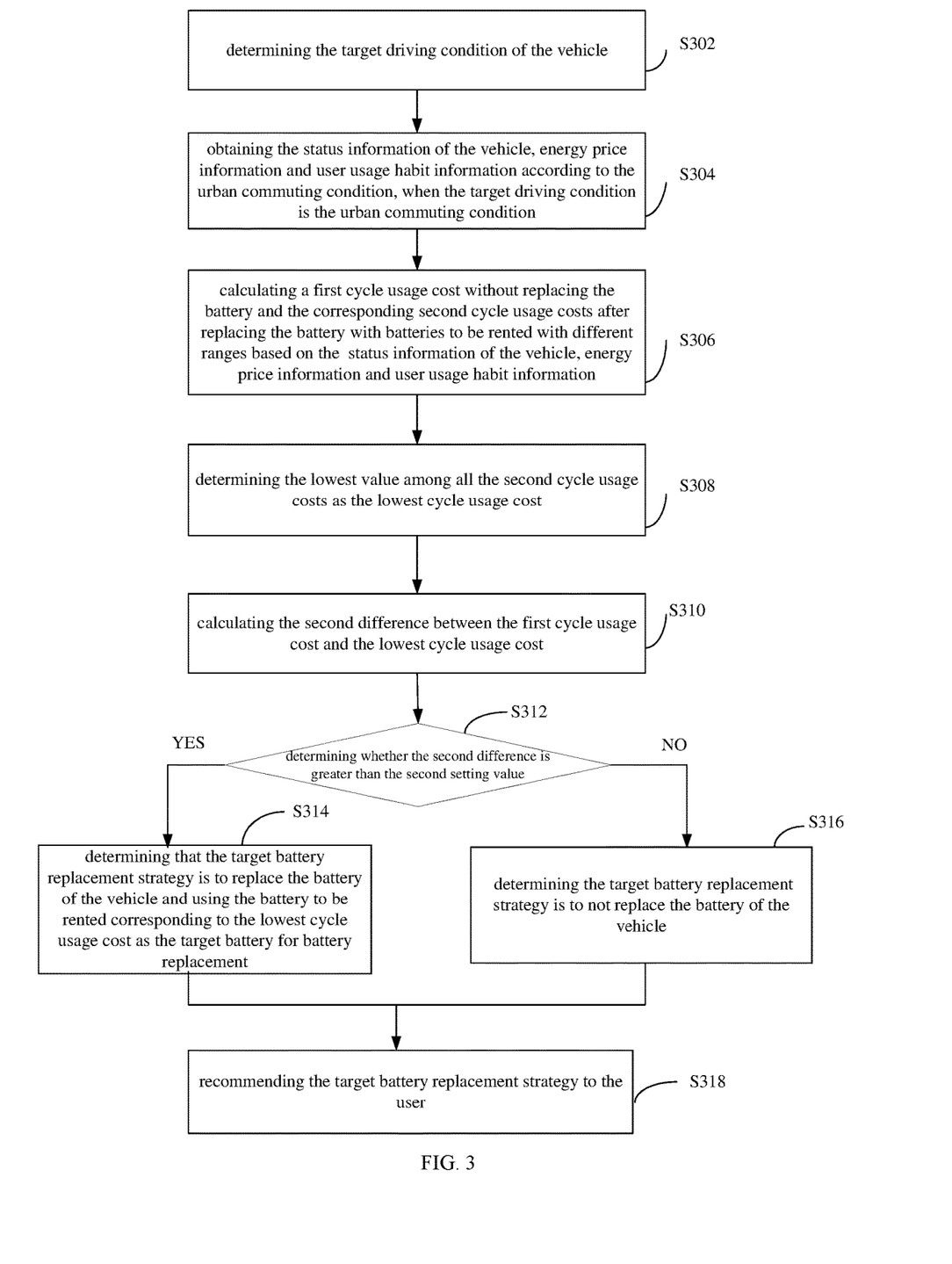
FIG. 3 shows a schematic flowchart of a battery replacement strategy determination method for a battery replacement hybrid vehicle according to another embodiment of the present application.

FIG. 3 shows a schematic flowchart of a battery replacement strategy determination method for a battery replacement hybrid vehicle according to yet another embodiment (Embodiment 2) of the present application. As shown in FIG. 3, the battery replacement strategy determination method in this embodiment includes the following steps S302 to S318.

Step S302, determining the target driving condition of the vehicle.

In Embodiment 2, it is determined that the target driving condition of the vehicle is the urban commuting condition.

In practical applications, this method can be started when the vehicle is already in urban commuting conditions (that is, when the vehicle has started daily commuting) to determine the battery replacement strategy, for example, started when the vehicle reaches the battery replacement station during the urban commuting.

Determining the target driving condition can be carried out in various ways. For example, it can be determined by receiving the condition information input by the user (such as information of the urban commuting condition confirmed by the user), or by obtaining real-time parameters (such as vehicle speed, current location, etc.).

Step S304, obtaining the status information of the vehicle, energy price information and user usage habit information according to the urban commuting condition, when the target driving condition is the urban commuting condition.

Under medium and low-speed urban commuting conditions, the battery replacement hybrid vehicle can operate in pure electric or hybrid modes, and the user's usage habits (such as daily commuting distance, charging cycle) will also affect the operation of the vehicle. Therefore, factors such as vehicle status, energy prices, and user usage habits need to be comprehensively considered to estimate the economic benefits of battery replacement. Therefore, in Embodiment 3, when the target driving condition is the urban commuting condition, status information of the vehicle, energy price information, and user usage habit information are obtained as a basis for subsequent determination of the battery replacement strategy.

After determining that the target driving condition is the urban commuting condition and obtaining the status information of the vehicle, energy price information and user usage habit information accordingly, the target battery replacement strategy can be determined based on the battery replacement strategy determination rules corresponding to the urban commuting condition. In a specific implementation, the battery replacement strategy determination rule corresponding to the urban commuting condition includes: calculating a first cycle usage cost without replacing the battery and the corresponding second cycle usage costs after replacing with batteries with different ranges to be rented based on the status information of the vehicle, energy price information and user usage habit information; determining the lowest value among all second cycle usage costs as the lowest cycle usage cost; calculating a second difference between the first cycle usage cost and the lowest cycle usage cost; determining whether the second difference is greater than a second setting value; in response to that the second difference is greater than the second setting value, determining the target battery replacement strategy is to replace the battery of the vehicle and using the battery to be rented corresponding to the lowest cycle usage cost as the target battery for replacing the battery; and in response to that the second difference is not greater than the second setting value, determining the target battery replacement strategy is to not replace the battery of the vehicle.

Accordingly, based on the obtained information, the step of determining the target battery replacement strategy according to the battery replacement strategy determination rule corresponding to the target driving condition can be specifically implemented as the following steps.

Step S306, calculating a first cycle usage cost without replacing the battery and the corresponding second cycle usage costs after replacing the battery with batteries to be rented with different ranges based on the status information of the vehicle, energy price information and user usage habit information.

It should be noted that the cycle mentioned here refers to the charging cycle of the vehicle.

Step S308, determining the lowest value among all the second cycle usage costs as the lowest cycle usage cost.

Step S310, calculating the second difference between the first cycle usage cost and the lowest cycle usage cost.

Step S312, determining whether the second difference is greater than the second setting value. In response to that the second difference is greater than the second setting value, step S314 is executed. In response to that the second difference is not greater than the second setting value, step S316 is executed.

Step S314, determining that the target battery replacement strategy is to replace the battery of the vehicle and using the battery to be rented corresponding to the lowest cycle usage cost as the target battery for battery replacement.

Step S316, determining the target battery replacement strategy is to not replace the battery of the vehicle.

Step S318, recommending the target battery replacement strategy to the user.

In this embodiment, the second difference between the first cycle usage cost and the lowest cycle usage cost is the economic benefit brought by the battery replacement. The second setting value can be set by the user according to the desired economy. The second setting value may be the same as or different from the first setting value. In addition, when setting the second setting value, the price of replacing the battery at the battery replacement station (including the price of removing the battery at the battery replacement station and the price of loading the battery at the battery replacement station) can also be taken into consideration. Due to the fact that replacing the current battery with a battery with a different range to be rented will produce the cost of replacing the battery at the battery replacement station. By considering the price of replacing the battery at the battery replacement station when setting the second setting value (that is, the cost of replacing the battery at the battery replacement station is reflected in the second setting value), it is possible to simplify the calculation of the second cycle usage cost of the rented batteries with different ranges.

In a specific implementation of this embodiment, the user usage habit information can include the charging cycle T of the vehicle and the total driving mileage of the vehicle during n charging cycles before the current moment, where n is an integer greater than or equal to 3. The status information of the vehicle can include the current power consumption per unit distance of the vehicle, average driving fuel consumption in the urban fuel mode, the current remaining mileage of the battery of the vehicle, and the current remaining mileage of the fuel of the vehicle. The energy price information can include the current oil price, current electricity price, rental prices of batteries to be rented with different ranges, and rental prices of the battery of the vehicle (i.e., the current battery of the vehicle). In this embodiment, the charging cycle T of the vehicle can be a convenient charging cycle selected by the user (driver).

In this case, in step S306, the corresponding second cycle usage costs after replacing with the batteries to be rented with different ranges can be calculated in the following method:

for the batteries to be rented with different ranges, determining whether the quotient of the total driving mileage of the vehicle during n charging cycles before the current moment and n is less than or equal to the range of the battery to be rented;

in response to that the quotient of the total driving mileage of the vehicle during n charging cycles before the current moment and n is less than or equal to the range of the battery to be rented, calculating the second cycle usage cost corresponding to the battery to be rented according to formula (3):

$$\text{Cost3} = W + U/n/100 \times M \times N \quad (3); \text{ or}$$

in response to that the quotient of the total driving mileage of the vehicle during n charging cycles before the current moment and n is greater than the range of the battery to be rented, calculating the second cycle usage cost corresponding to the battery to be rented according to formula (4):

$$\text{Cost3} = W + M \times N \times R/100 + (U/n - R)/100 \times H \times C \quad (4).$$

In the above formulas (3) and (4), cost3 represents the corresponding second cycle usage costs of the batteries to be rented with different ranges, in yuan; R represents the range of each battery to be rented, in kilometers; W represents the rental price of the batteries to be rented with different ranges, in yuan; U represents the total driving mileage of the vehicle during n charging cycles before the current moment, in kilometers; M represents the current power consumption per unit distance of the vehicle, in kWh/100 km; N represents the current electricity price, in yuan/kWh; H represents the average driving fuel consumption in the urban fuel mode, in liters/100 km; and C represents the current oil price, in yuan/liter.

The following example illustrates the calculation of the second cycle usage cost of batteries to be rented with different ranges. For example, assuming n=3, the rental price list of batteries to be rented at the battery replacing station is as follows:

| range (km)          | 100 | 200 | 300 | 400 | 500 | Rn |
| rental price (yuan) | W1  | W2  | W3  | W4  | W5  | Wn |

The second cycle usage cost of batteries with different battery capacities (range) is calculated based on the information in the table above.

The second cycle usage cost of the battery with the range of 100 km:
when U/3 is less than or equal to 100 km, cost3=W1+U/3/100×M×N; and
when U/3 is greater than 100 km, cost3=W1+M×N×100/100+(U/3−100)/100×H×C.

The second cycle usage cost of the battery with the range of 200 km:
when U/3 is less than or equal to 200 km, cost3=W2+U/3/100×M×N; and
when U/3 is greater than 200 km, cost3=W2+M×N×200/100+(U/3−200)/100×H×C.

In this way, the second cycle usage cost of the battery with the range of Rn km:
when U/3 is less than or equal to Rn km, cost3=Wn+U/3/100×M×N; and
when U/3 is larger than Rn km, cost3=Wn+M×N×Rn/100+(U/3−Rn)/100×H×C.

Further, in step S306, the first cycle usage cost without replacing the battery can be calculated as follows:
when a sum of the current remaining mileage of the battery of the vehicle and the current remaining mileage of the fuel is greater than or equal to the quotient of the total driving mileage of the vehicle during n charging cycles before the current moment and n, it is determined that whether the quotient of the total driving mileage of the vehicle during n charging cycles before the current moment and n is less than or equal to the current remaining mileage of the battery of the vehicle;

in response to that the quotient of the total driving mileage of the vehicle during n charging cycles before the current moment and n is less than or equal to the current remaining mileage of the battery of the vehicle, calculating the first cycle usage cost according to formula (5):

$$Cost3=Y+U/n/100 \times M \times N \quad (5); or$$

in response to that the quotient of the total driving mileage of the vehicle during n charging cycles before the current moment and n is greater than the current remaining mileage of the battery of the vehicle, calculating the first cycle usage cost according to formula (6):

$$Cost3=Y+M \times N \times P/100+(U/n-P)/100 \times H \times C \quad (6).$$

In the above formulas (5) and (6), cost4 represents the first cycle usage cost of the battery, in yuan; P represents the current remaining mileage of the battery of the vehicle, in kilometers; Y represents the rental price of the battery of the vehicle, in yuan; U represents the total driving mileage of the vehicle during n charging cycles before the current moment, in kilometers; M represents the current power consumption per unit distance of the vehicle, in kilowatt hours per 100 kilometers; N represents the current electricity price, in yuan/kWh; H represents the average driving fuel consumption in the urban fuel mode, in liters per 100 kilometers; and C represents the current oil price, in yuan/liter.

In this embodiment, under urban commuting conditions, the economic benefits brought by battery replacement are calculated based on factors such as daily commuting distance (specifically, cycle driving mileage), vehicle status, fuel price and battery rental price. Only when the difference between the lowest cycle usage cost of the batteries with different ranges and the cycle usage cost without battery replacement of the current vehicle is greater than the second setting value, the user is recommended to replace the battery, which can avoid frequent battery replacement, and at the same time, it can also recommend a suitable range battery to the user, reduce battery usage costs, improve battery utilization, and further improve vehicle economy.

Of course, those skilled in the art can understand that the method of this embodiment is also performed on the premise that the normal driving of the hybrid vehicle can be ensured.

Figure 4:
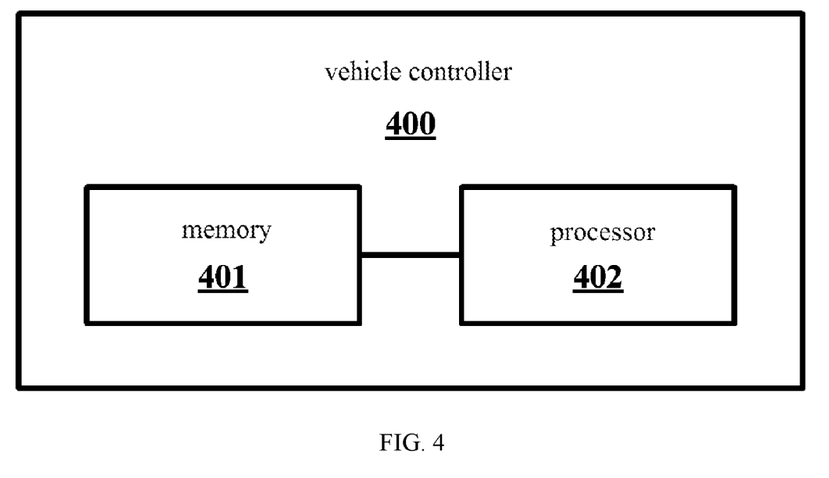
FIG. 4 shows a schematic structural diagram of a vehicle controller according to an embodiment of the present application.

Based on the same inventive concept, embodiments of the present application also provide a vehicle controller. FIG. 4 shows a schematic structural diagram of a vehicle controller 400 according to an embodiment of the present application. As shown in FIG. 4, the vehicle controller 400 includes a memory 401 and a processor 402. A machine executable program is stored in the memory 401. The processor 402 is connected to the memory 401, and is configured to implement the power replacement strategy determination method of any one of the foregoing embodiments or combinations of embodiments when the machine executable program is executed by the processor 402.

Based on the same inventive concept, an embodiment of the present application also provides a battery replacement hybrid vehicle, which includes the vehicle controller 400 as described above.

According to any one of the above optional embodiments or a combination of multiple optional embodiments, the embodiments of the present application can achieve the following beneficial effects.

The battery replacement strategy determination method for the battery replacement hybrid vehicle, the vehicle controller and the battery replacement hybrid vehicle provided by the present application can selectively obtain the status information of the vehicle, energy price information and user usage habit information according to different vehicle driving conditions, and determine and recommend appropriate target battery replacement strategies to users based on the obtained information and guided by the economic benefits brought by battery replacement, thereby ensuring the convenience of vehicle use while ensuring the economy of vehicle use and reducing vehicle usage costs for users (drivers) under different driving conditions.

Furthermore, in long-distance high-speed driving conditions, the total driving cost without removing the battery and the total driving cost after removing the battery are calculated based on the status information of the vehicle and energy price information respectively, and compared to determine whether to remove the battery, further improving the overall economy of the vehicle under high-speed driving conditions.

Furthermore, under urban commuting conditions, the cycle usage costs without replacing the battery and the cycle usage costs after replacing it with the batteries with different ranges are calculated based on the status information of the vehicle, energy price information (including oil prices and electricity prices) and user usage habit information. Based on the calculation results, it is determined whether to replace the battery, and if it is determined to replace the battery, the suitable range battery will be recommended to the user, reducing the usage cost of the battery, improving the utilization rate of the battery, and further improving the overall economy of the vehicle.

Those skilled in the art can clearly understand that for the specific working processes of the systems, devices and units described above, reference can be made to the corresponding processes in the embodiments of the foregoing method, which will not be described again for the sake of brevity.

In addition, each functional unit in various embodiments of the present application can be physically independent of each other, or two or more functional units can be integrated together, or all functional units can be integrated into one processing unit. The above integrated functional units can be implemented in the form of hardware, software or firmware.

Those skilled in the art can understand that if the integrated functional unit is implemented in the form of software and sold or used as an independent product, it can be stored in a computer-readable storage medium. Based on this understanding, the technical solution of the present application essentially or all or part of the technical solution can be embodied in the form of a software product. The computer software product is stored in a storage medium, which includes several instructions to enable a computing device (such as a personal computer, a server, or a network device, etc.) to perform all or part of the steps of the methods described in various embodiments of the present application when executing the instructions. The aforementioned storage media include USB flash drives, mobile hard drives, read-only memory (ROM), random access memory (RAM), magnetic disk or optical disk and other media that can store program codes.

Alternatively, all or part of the steps to implement the foregoing method of the embodiments can be completed by hardware (such as a personal computer, a server, or a computing device such as a network device) related to program instructions, and the program instructions can be stored in a computer-readable storage medium. When the program instructions are executed by the processor of the computing device, the computing device performs all or part of the steps of the methods described in various embodiments of the present application.

Finally, it should be noted that the above embodiments are only used to illustrate the technical solution of the present application, but not to limit the present application. Although the present application has been described in detail with reference to the foregoing embodiments, those skilled in the art should understand that the technical solutions described in the foregoing embodiments can be modified or equivalent substitutions for some or all of the technical features are made within the principles of the present application, and these modifications or substitutions do not deviate the corresponding technical solutions from the scope of the present application.

What is claimed is:

1. A battery replacement strategy determination method for a battery replacement hybrid vehicle, comprising:
determining a target driving condition of the vehicle, wherein the target driving condition is a current driving condition or an upcoming driving condition of the vehicle;
selectively obtaining required information from status information of the vehicle, energy price information, and user usage habit information according to the target driving condition; and
determining a target battery replacement strategy according to a battery replacement strategy determination rule corresponding to the target driving condition, based on the obtained information, and recommending the target battery replacement strategy to a user,
wherein the target driving conditions comprise a long-distance high-speed driving condition and an urban commuting condition;
wherein when the target driving condition is the long-distance high-speed driving condition, the step of selectively obtaining the required information from the status information of the vehicle, the energy price information and the user usage habit information according to the target driving condition comprises:
obtaining the status information of the vehicle and the energy price information,
wherein the status information of the vehicle comprises the set distance to be traveled, the increase in fuel consumption of current weight of a battery under the long-distance high-speed driving condition, current remaining mileage of the battery, and average fuel consumption of the vehicle without the battery under the long-distance high-speed driving condition; and the energy price information comprises a price of removing the battery at a battery replacement station, a price of loading the battery at the battery replacement station, current power consumption per unit distance of the vehicle, a current oil price and a current electricity price;
wherein the battery replacement strategy determination rule corresponding to the long-distance high-speed driving condition comprises:
calculating a first total traveling cost without removing the battery and a second total traveling cost after removing the battery based on the status information of the vehicle and the energy price information;
calculating a first difference between the first total traveling cost and the second total traveling cost;
determining whether the first difference is greater than a first setting value;
determining the target battery replacement strategy is to remove the battery, in response to that the first difference is greater than the first setting value; and
determining the target battery replacement strategy is to not remove the battery, in response to that the first difference is not greater than the first setting value;
or,
wherein when the target driving condition is the urban commuting condition, the step of selectively obtaining the required information from the status information of the vehicle, the energy price information and the user usage habit information according to the target driving condition comprises:
obtaining the status information of the vehicle, the energy price information and the user usage habit information, wherein the user usage habit information comprises a charging cycle T of the vehicle and total driving mileage of the vehicle during n charging cycles before current moment, n is an integer greater than or equal to 3; the status information of the vehicle comprises current power consumption per unit distance of the vehicle, average driving fuel consumption in an urban fuel mode, current remaining mileage of the battery of the vehicle and current remaining mileage of the fuel of the vehicle; the energy price information comprises a current oil price, a current electricity price, a rental price of the batteries to be rented with different ranges, and a rental price of the battery of the vehicle;
wherein the battery replacement strategy determination rule corresponding to the urban commuting condition comprises:
calculating a first cycle usage cost without replacing the battery and the corresponding second cycle usage costs after replacing the battery with batteries to be rented with different ranges based on the status information of the vehicle, the energy price information and the user usage habit information;
determining the lowest value among all the second cycle usage costs as the lowest cycle usage cost;
calculating a second difference between the first cycle usage cost and the lowest cycle usage cost;
determining whether the second difference is greater than a second setting value;
in response to that the second difference is greater than the second setting value, determining the target battery replacement strategy is to replace the battery of the vehicle and using the battery to be rented corresponding to the lowest cycle usage cost as a target battery for replacing the battery; or
in response to that the second difference is not greater than the second setting value, determining the target battery replacement strategy is to not replace the battery of the vehicle.

2. The battery replacement strategy determination method of claim 1, wherein the first total traveling cost is calculated according to formula (1): Cost1=F×N×D/100+(L−D)/100× (E+B)×C (1); the second total traveling cost is calculated according to formula (2): Cost2=(A1+A2)+L/100×E×C (2);
wherein Cost1 and Cost2 respectively represent the first total traveling cost and the second total traveling cost, in yuan; A1 and A2 respectively represent the price of removing the battery at the battery replacement station and the price of loading the battery at the battery replacement station, in yuan; L represents the set distance to be traveled, in kilometers; B represents the increase in fuel consumption of the current weight of the battery under the long-distance high-speed driving condition, in liters/100 kilometers; C represents the current oil price, in yuan/liter; D represents the current remaining mileage of the battery, in kilometers; E represents the average fuel consumption of the vehicle without the battery under the long-distance high-speed driving condition, the unit is liter/100 kilometers; F represents the current power consumption per unit distance of the vehicle, in kilowatt-hour/100 kilometers; and N represents the current electricity price, in yuan/kilowatt-hour.

3. The battery replacement strategy determination method of claim 1, wherein the step of calculating the corresponding second cycle usage costs after replacing the battery with batteries to be rented with different ranges comprises:

for the batteries to be rented with different ranges, determining whether a quotient of the total driving mileage of the vehicle during n charging cycles before the current moment and n is less than or equal to the range of the battery to be rented;

in response to that the quotient of the total driving mileage of the vehicle during n charging cycles before the current moment and n is less than or equal to the range of the battery to be rented, calculating the corresponding second cycle usage cost of the battery to be rented according to formula (3): $Cost3 = W + U/n/100 \times M \times N$ (3); or in response to that the quotient of the total driving mileage of the vehicle during n charging cycles before the current moment and n is greater than the range of the battery to be rented, calculating the corresponding second cycle usage cost of the battery to be rented according to formula (4): $Cost3 = W + M \times N \times R/100 + (U/n - R)/100 \times H \times C$ (4);

wherein Cost3 represents the corresponding second cycle usage cost of the batteries to be rented with different ranges, in yuan; R represents the range of the batteries to be rented, in kilometers; W represents the rental price of the batteries to be rented with different ranges, in yuan; U represents the total driving mileage of the vehicle during n charging cycles before the current moment, in kilometers; M represents the current power consumption per unit distance of the vehicle, in kilowatt hours/100 kilometers; N represents the current electricity price, in yuan/kilowatt hour; H represents the average driving fuel consumption in the urban fuel mode, in liter/100 kilometers; and C represents the current fuel price, in yuan/liter.

4. The battery replacement strategy determination method of claim 1, wherein the step of calculating the first cycle usage cost without replacing the battery comprises:

in response to that a sum of the current remaining mileage of the battery of the vehicle and the current remaining mileage of the fuel is greater than or equal to the quotient of the total driving mileage of the vehicle during n charging cycles before the current moment and n, determining whether the quotient of the total driving mileage of the vehicle during n charging cycles before the current moment and n is less than or equal to the current remaining mileage of the battery of the vehicle;

in response to that the quotient of the total driving mileage of the vehicle during n charging cycles before the current moment and n is less than or equal to the current remaining mileage of the battery of the vehicle, calculating the first cycle usage cost according to formula (5): $Cost4 = Y + U/n/100 \times M \times N$ (5); or in response to that the quotient of the total driving mileage of the vehicle during n charging cycles before the current moment and n is greater than the current remaining mileage of the battery of the vehicle, calculating the first cycle usage cost according to formula (6): $Cost4 = Y + M \times N \times P/100 + (U/n - P)/100 \times H \times C$ (6), wherein Cost4 represents the first cycle usage cost of the battery, in yuan; P represents the current remaining mileage of the battery of the vehicle, in kilometers; Y represents the rental price of the battery of the vehicle, in yuan; U represents the total driving mileage of the vehicle during n charging cycles before the current moment, in kilometers; M represents the current power consumption per unit distance of the vehicle, in kilowatt hours per 100 kilometers; N represents the current electricity price, in yuan/kWh; H represents the average driving fuel consumption in the urban fuel mode, in liters per 100 kilometers; and C represents the current oil price, in yuan/liter.

5. A vehicle controller, comprising: a memory in which a machine executable program is stored; and a processor, wherein the machine executable program is configured to implement the battery replacement strategy determination method of claim 1 when executed by the processor.

6. A battery replacement hybrid vehicle, comprising the vehicle controller of claim 5.

* * * * *